Sept. 6, 1932.  E. J. HALL  1,875,724
INTERNAL COMBUSTION ENGINE
Filed Oct. 27, 1928   2 Sheets-Sheet 1
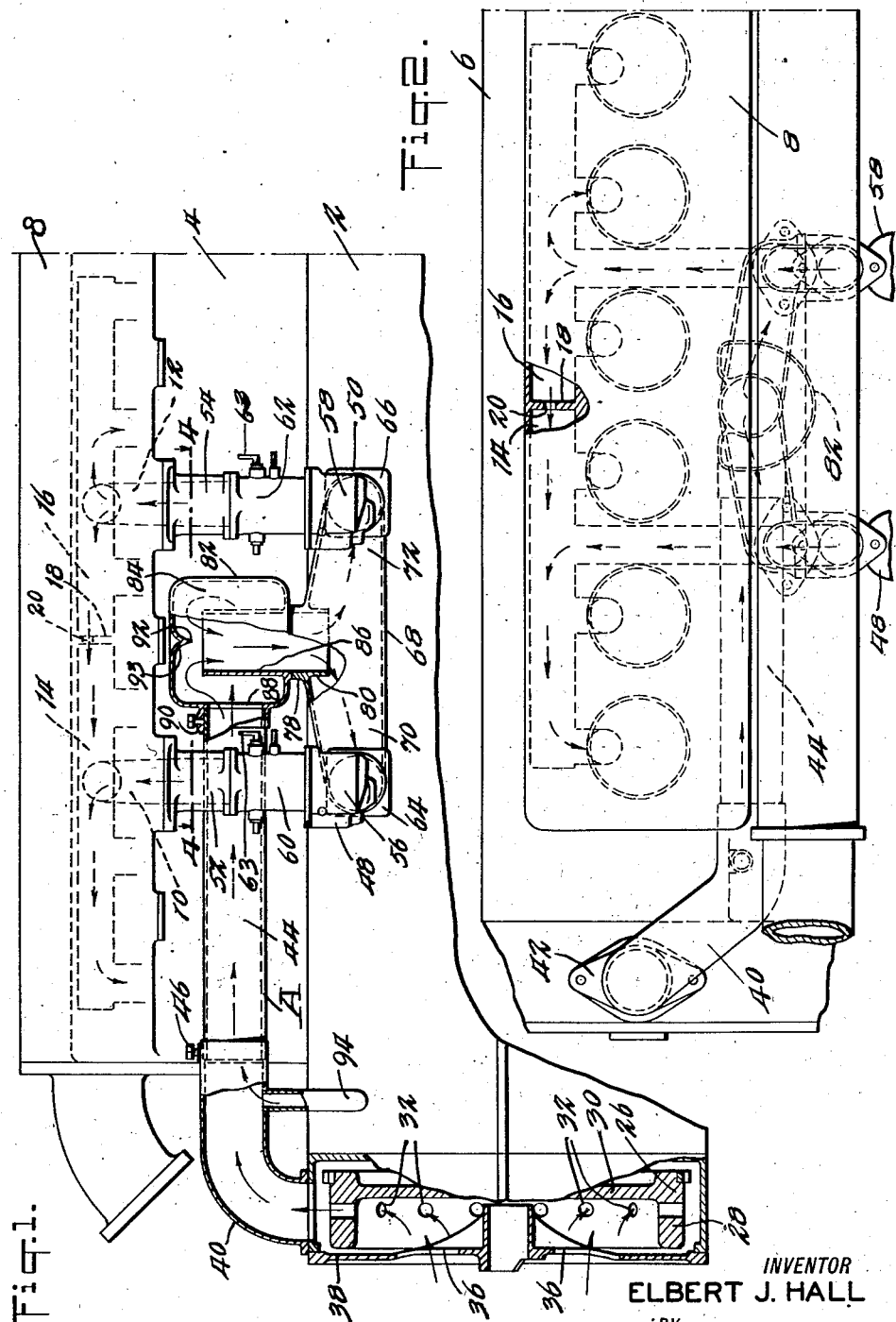
INVENTOR
ELBERT J. HALL
ATTORNEY Sept. 6, 1932. E. J. HALL 1,875,724
INTERNAL COMBUSTION ENGINE
Filed Oct. 27, 1928 2 Sheets-Sheet 2
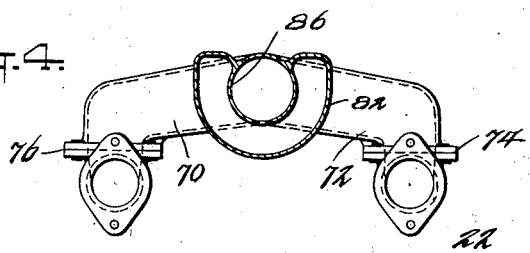
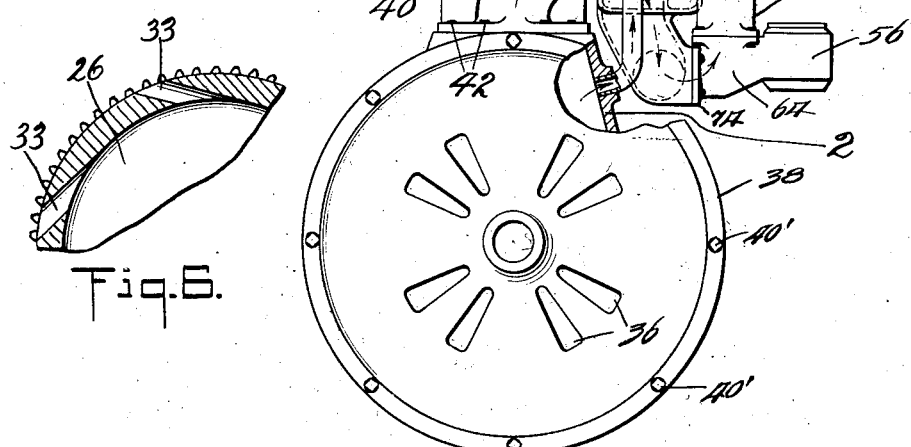
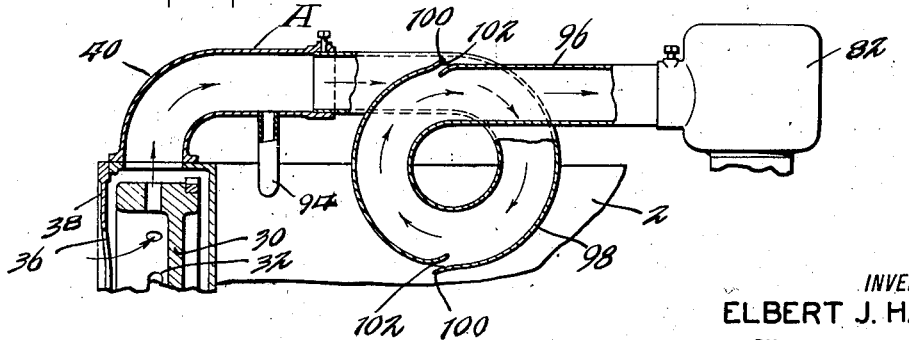
INVENTOR
ELBERT J. HALL
BY
ATTORNEY Patented Sept. 6, 1932

1,875,724

UNITED STATES PATENT OFFICE

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE

INTERNAL COMBUSTION ENGINE

Application filed October 27, 1928. Serial No. 315,518.

The accompanying drawings illustrate the preferred form of the invention; though it is to be understood that the invention is not limited to the exact details of construction shown and described, as it is obvious that various modifications thereof within the scope of the claims will occur to persons skilled in the art.

In the drawings:

Figure 1 is a fragmentary side elevation of an internal combustion engine showing the invention, certain parts being shown in section;

Fig. 2 is a top plan view of the engine shown in Fig. 1;

Fig. 3 is an end elevation of the engine shown in Fig. 1, certain parts being shown in section;

Fig. 4 is a sectional view of the line 4—4, Fig. 1;

Fig. 5 is a sectional view of a modified form of conduit forming a part of the present invention; and Fig. 6 is a fragmentary sectional view showing a modified form of fly wheel.

This invention relates to internal combustion engines and has particular reference to means for increasing the speed and power thereof.

One of the objects of the present invention is to provide means operative in accordance with the speed of an internal combustion engine for delivering atmospheric air to the mixing chamber of a carburetor at a pressure above atmospheric.

Another object of the invention is to provide means for delivering fuel mixture to an internal combustion engine at a pressure above atmospheric.

Another object of the invention is to provide, in an internal combustion engine having a duplex carburetor assembly, a means for delivering substantially equal amounts of fuel mixture to said carburetors at a pressure above atmospheric.

This invention also contemplates the provision of means for reducing the fire hazard incident to the usual operation of a marine engine by dissipating the flame of a backfire from the engine.

A still further object of the invention is to provide means for directing backfire from an internal combustion engine of the marine type to the fly wheel housing whereby the backfire will be dissipated by the fly wheel in the housing and any gases cooled by said fly wheel below the point of ignition.

Other objects and advantages of this invention will be apparent from the following description taken with the accompanying drawings in which an internal combustion engine is more or less diagrammatically shown which is of the marine type having a plurality of cylinders and comprising a crank case 2, a cylinder block 4, and a cylinder head 6.

The engine shown is of a type having a combined intake manifold and exhaust indicated generally at 8 and comprising the intakes 10 and 12 leading to the passages 14 and 16 respectively, formed in the head by a dividing wall 18 which is apertured at 20 to provide a means for balancing the pressures of the gases in said passages. The intake is cast with a double walled structure 22 providing the exhaust passage 24, and the entire casting is secured in any suitable or desired manner to the cylinder head 6; the double walls being adapted to receive between them a cooling medium such as water or the like.

The engine is provided with a crank shaft, not shown, to the end of which is secured a fly wheel 26 which is substantially pan-shaped and comprises a rim 28 and a web 30. The fly wheel is so constructed as to form a fan or blower to draw atmospheric air into a conduit indicated generally at A, and to that end the rim is provided with a plurality of apertures 32 which, upon rotation of the fly wheel, draw air from the atmosphere into the fly wheel housing 34 through openings 36 formed in the housing cover 38 secured to said housing by bolts 40' or the like. The air is delivered from the housing into the conduit A; the air first passing through the elbow pipe 40 secured at one end to the housing as at 42, and the other end of the pipe 40 receives one end of a connecting pipe 44 the connection being a rigid one through the medium of a set screw 46 or the like.

Fig. 1 shows the apertures 32 as being substantially radially arranged, but this is merely by way of example as obviously the openings may be arranged at an angle extending outwardly from the axis and backwardly with respect to the direction of rotation as shown at 33 in Fig. 6 whereby to increase the blowing effect of the fly wheel in accordance with desired and required circumstances.

The engine shown in the drawings is of the duplex carburetor type, as heretofore mentioned, and carburetors 48 and 50 are shown more or less diagrammatically, the same being connected to the intakes 10 and 12 by conduits 52 and 54 respectively, and comprising the float chambers 56 and 58, discharge pipes 60 and 62, and mixing chambers 64 and 66 interposed between and connected to the float chambers and discharge passages. The carburetors are connected to a common source of fuel supply (not shown) and are connected for simultaneous actuation by means of a suitable control lever (not shown) connected to the throttle valve levers 63.

Should the incoming air be led directly to the carburetors, it has been found that one carburetor will receive more air than the other this resulting in unbalanced operation of the carburetors. To eliminate such a condition, there has been provided a means for obtaining substantially equal distribution of the air to each carburetor, and to that end a distributor indicated generally at 68 is provided which comprises a casting having oppositely extending conduits 70 and 72 connected respectively to the mixing chambers 64 and 66 as shown clearly at 74 and 76 in Fig. 4. The distributor is preferably of the form shown in Fig. 1 and includes an inlet opening in its upper face surrounded by aligned external and internal flanges 78 and 80 and said distributor communicates through the opening with an accumulator or pressure reservoir 82 secured thereto as clearly shown in Fig. 1.

The accumulator 82 is preferably of the form shown and comprises a shell or casing 84 having a discharge pipe 86 extending upwardly therein and aligned with the flanges 78 and 80 of the distributor. The pipe 86 is preferably formed integral with the shell, but obviously may be formed separately if desired, and the pipe extends upwardly within the shell to a point such that its upper edge is arranged substantially in the same horizontal plane as the upper portion of an opening 88 formed in the shell 82. This disclosure is merely illustrative however, for a purpose to be presently described, and the pipe may have its upper edge arranged above the top of the opening 88. The opening 88 is surrounded by an attaching flange 90 by which the accumulator is connected to the conduit A, and the upper portion or top of the accumulator is pressed inwardly as shown at 92 in the shape of a cone whereby to provide a continuous curved deflecting surface 93 for the air in the reservoir to direct the same downwardly into the pipe 86.

Means are provided for preventing the escape of crank case vapors into the atmosphere and to that end a pipe 94 is provided which is connected with the upper portion of the crank case 2 and leads into the elbow pipe 40 and it will be apparent that the incoming air from the fly wheel housing, in passing through the pipe 40 and past the outlet end of the pipe 94, will serve to draw the vapors from the crank case into the pipe 40 by the suction induced by the rapid passage of air through the conduit 40, and said vapors are led through the conduit, mixed with the air drawn into the carburetors and then into the engine with the fuel mixtures, to be burned.

Fig. 5 discloses a modification of the conduit A wherein means are provided for causing the ejection of dirt or other foreign matter which may have been entrained with the incoming air in the pipe 40, and to that end the connecting pipe 44 shown in Fig. 1 has been modified and is shown as interposed between the reservoir 82 and the pipe 40 and provided with a coil 98 having portions struck therefrom as at 100. Any dirt or foreign matter which may be entrained with the air will naturally be thrown to the outer surface of the coil 98 by centrifugal action and in passing through the coil the dirt will be expelled through the openings 102 as defined by the struck out portions 100.

It is believed that the operation of the invention shown herein and just described will be fully apparent to those skilled in the art, but a brief résumé of the operation is given herewith.

With the parts assembled and arranged as shown in the drawings, upon starting the engine the crank shaft thereof will rotate the fly wheel thereby drawing in atmospheric air and forcing the same through the conduit A, the passage of said air being of course aided by the normal suction of the engine, and the air will be delivered into the accumulator 82, from whence it will pass into the pipe 86 and be delivered into the distributor 68. It will be apparent that the pipe 86 being arranged adjacent the opening 88 in the accumulator will serve as a baffle for the air from the conduit 44. The capacity of the accumulator 82 is comparatively large, and since the accumulator and baffles are so arranged that the air entering from the conduit 44 circulates thru the accumulator before passing into the outlet conduit 86, the velocity of the air passing thru the accumulator is reduced, and the pressure increased.

It should be understood that while the centrifugal action of the fly wheel may be loosely spoken of as producing pressure, what actually occurs is that the fly wheel imparts energy in the form of velocity to the air. The increased velocity actually reduces the pressure while the air is passing thru the conduit 40, as attested by the fact that air is drawn into the conduit 40 from the conduit 94, instead of the opposite. When the air enters the accumulator 82, the velocity is greatly reduced, and the energy which it had previously carried in the form of velocity is partially transformed into pressure.

The top of the accumulator 92—93 forms a baffle which serves to direct the air, under pressure from the accumulator, into the conduit 86 and in a general line of flow parallel to the axis of that conduit. From the distributor, the air will then pass to the mixing chambers of the respective carburetors. The air in the mixing chambers will be mixed with the fuel from the carburetors and the resultant mixture will be forced through the discharge passage 60 into the intake manifold and then into the engine to be burned; the air in the conduit A carrying the crank case vapors along to be burned by the engine.

With the apertures 32 radially arranged, there will be some substantial building up of pressure in the accumulator 82, due to the action of the fly wheel as a centrifugal pump but it is sometimes desirable under certain conditions to build up a higher pressure in the accumulator, and to that end the fly wheel may be provided with apertures 33, heretofore mentioned, formed at such an angle as to extend outwardly from the axis of the flywheel and backwardly with respect to the direction of rotation, the particular angle being of course predetermined to meet desired and required conditions, and the angular arrangement of the apertures 33 will, upon actuation of the fly wheel, force air into the accumulator 82 at a rate sufficient to build up an air pressure therein and also in the distributor 68, which pressure will vary according to the speed of the fly wheel and the angle of the apertures 33.

The cone 94 is arranged above the upper end of the pipe 86 and substantially above the center thereof, and this arrangement causes an approximately uniform admission of air to the pipe 82 as will be apparent. Under certain conditions, as just described, the distributor is also, in effect, a pressure chamber, as the air admitted thereto is under pressure above atmospheric and consequently the air is substantially equally distributed to the mixing chambers.

The air being under pressure, the resultant fuel mixture is also under pressure greater than normal and hence the fuel mixture is passed through the manifolds and into the engine at a pressure greater than normal and the speed and power of the engine correspondingly increased.

Backfiring usually occurs when initially starting an engine, and the backfire will pass from the engine through the mixing chambers, the distributor 68, the accumulator 82, and the conduit A to the fly wheel housing, from where it is projected against the cool fly wheel and be dissipated thereby and by the apertures 32 therein, thus reducing the temperature of the backfire due to its contact with the cool fly wheel and also entirely breaking up the backfire and so prevent the danger of setting fire to the boat with which the engine is associated.

In the event of backfire from the engine during the operation thereof, should the backfire be strong enough to pass through the carburetors and into the distributor and pipe 86, it is apparent that the incoming air will dissipate the backfire rising in the pipe, if not completely, at least to a great extent due to the fact that the cone 92 will serve to spread the backfire into the incoming air. Any backfire which might pass through the conduit A will be immediately broken up by the fly wheel as will be apparent.

The present invention, therefore, effectually reduces to a minimum the fire hazard usually present in the operation of a marine engine.

What I claim is:

1. In an internal combustion engine, a plurality of carburetors, an intake manifold to which the carburetors are connected and means for directing air at a pressure above atmospheric to the carburetors, comprising a blower actuated by the crank shaft, a conduit receiving air from the blower, a distributor connected to the carburetors, an accumulator interposed between the conduit and distributor, and a conduit of smaller capacity than said accumulator leading from said accumulator to said distributor, said last-named conduit being at least partially surrounded by said acumulator.

2. In an internal combustion engine, a plurality of carburetors, and means for delivering fuel mixture to the engine at a pressure above atmospheric, comprising a blower actuated by the engine crank shaft in accordance with the speed of rotation of the latter, a conduit receiving air from the blower, an accumulator into which the air is delivered, a distributor connected to the carburetors, and means in the accumulator comprising a conduit co-axial therewith and partially surrounded thereby for directing the air therein uniformly into the distributor.

3. In an internal combustion engine, a plurality of carburetors, and means for delivering fuel mixture to the engine at a pressure above atmospheric, comprising a blower, an accumulator into which the air is delivered, a distributor connected to the carburetors, and means extending from the interior of the accumulator into the interior of the distributor for passing air from said accumulator to the distributor, said means in the accumulator serving as a baffle.

4. In an internal combustion engine, a plurality of carburetors, and means for delivering fuel mixture to the engine at a pressure above atmospheric, comprising a blower secured to the engine crank shaft, a conduit receiving air from the blower, a distributor connected to the carburetors, an accumulator at the end of the conduit, and a discharge tube connecting said accumulator and distributor and extending upwardly into the accumulator and serving as a baffle.

5. In an internal combustion engine, a plurality of carburetors, and a supercharger comprising a blower mounted on the engine crank shaft, a conduit receiving air from the blower, a distributor connected to the carburetors, an accumulator connecting the conduit and distributor and in which air pressure is built up, a discharge tube in the accumulator serving as a baffle, and means formed in the upper portion of the accumulator for directing air into the tube, to be delivered to the distributor.

6. In an internal combustion engine, a plurality of carburetors, and a supercharger comprising a fly wheel housing, a fly wheel mounted in the housing and provided with means for drawing air into the housing, a conduit receiving air from the housing, a distributor connected to the carburetors, an accumulator connecting the conduit and distributor, and a discharge tube extending from the upper portion of the accumulator into the distributor for leading air therefrom into the distributor, said tube serving as a baffle.

7. In an internal combustion engine, a plurality of carburetors, and a supercharger for delivering fuel mixture to the engine at a pressure above atmospheric comprising a combined fly wheel and blower mounted on the crank shaft and actuated thereby, a distributor connected to said carburetors and having a common inlet, a conduit receiving air from the blower and provided with a coil intermediate its ends, means in the coil for expelling entrained foreign matter from the air, an accumulator connecting the conduit and distributor and provided with an internal discharge tube communicating with the distributor at the inlet of the latter, and means formed in the accumulator for directing the air into the discharge tube.

8. In an internal combustion engine, a plurality of carburetors, and a supercharger for delivering fuel mixture to the engine at a pressure above atmospheric comprising a combined fly wheel and blower mounted on the crank shaft and actuated thereby, a distributor connected to said carburetors and having a common inlet, a conduit receiving air from the blower and provided with a coil intermediate its ends, means in the coil for expelling entrained foreign matter from the air, an accumulator connecting the conduit and distributor, a tubular baffle in said accumulator alined with the distributor inlet and forming a discharge tube, and means in the accumulator for directing a constant and uniform volume of air through the discharge tube.

9. In an internal combustion engine, a plurality of carburetors, and a supercharger for delivering fuel mixture to the engine at a pressure above atmospheric comprising a combined fly wheel and blower mounted on the crank shaft and actuated thereby, a distributor connected to said carburetors and having a common inlet, a conduit receiving air from the blower and provided with a coil intermediate its ends, means in the coil for expelling entrained foreign matter from the air, an accumulator connecting the conduit and distributor, a tubular baffle in said accumulator alined with the distributor inlet and forming a discharge tube, means in the accumulator for directing a constant and uniform volume of air through the discharge tube, and means for passing vapors from the engine crank case to the conduit.

10. In an internal combustion engine, a plurality of carburetors, and means for delivering fuel mixture to the engine at a pressure above atmospheric comprising an air conduit, a distributor connected to the carburetors, an accumulator receiving air from the conduit and in which air pressure is built up, and a discharge tube connecting said accumulator and distributor and extending into the accumulator.

11. In an internal combustion engine, means forming an intake manifold, means for supplying fuel mixture under pressure to said manifold, and means for dissipating backfire comprising an expansion chamber between said pressure producing means and said engine said expansion chamber having an inlet and an outlet, and stationary baffle means for preventing straight line communication between said inlet and said outlet, whereby backfiring gases will be prevented from passing through said expansion chamber in a direct line.

12. In an internal combustion engine, a plurality of carbureters, intake manifolds supplying fuel mixture from said carbureters to said engine, means for supplying air under pressure to said carbureters, and means for dissipating backfire comprising an enlarged chamber having a comparatively restricted inlet and outlet, said chamber having its inlet connected to said pressure means and its outlet connected to said carbureter and baffle means to prevent straight line communication between said inlet and outlet.

13. In an internal combustion engine, a plurality of carbureters, a distributor having a plurality of branches of equal length each terminating at one of said carbureters, said distributor having an inlet, a blower operated by said engine for supplying air under pressure to said carbureters, and means for dissipating backfire comprising an expansion chamber located directly adjacent the inlet of said distributor, and a baffle in said chamber for preventing straight line flow of backfiring gases from the outlet to the inlet.

14. In an internal combustion engine, a pair of carbureters, a distributor for supplying air to said carbureters, said distributor comprising a pair of laterally extending branches of equal length terminating at said carbureters, said distributor having an inlet comprising a conduit, the axis of said conduit substantially bisecting the angle between the branches of said distributor, an accumulating chamber of larger sectional area than said conduit for supplying air under pressure thereto, said conduit extending into said accumulating chamber and being at least partially surrounded thereby and a blower for supplying air at high velocity to said accumulator.

15. In an internal combustion engine, an intake manifold, a carbureter for supplying fuel mixture to said manifold, means for supplying air under pressure to said carbureter, and means for dissipating backfire comprising a baffle of substantially conical shape mounted in the normal line of travel of the backfire, said conical baffle being mounted in a chamber of substantial size, said chamber having a normal inlet at right angles to said baffle and an outlet at right angles to said inlet, said outlet being substantially co-axial with said conical baffle.

16. In an internal combustion engine, an intake manifold, a carbureter for supplying fuel mixture to said manifold, a supply conduit for supplying air to said carbureter, means for supplying air under pressure to said conduit, and means for dissipating backfire comprising a substantially conical baffle mounted coaxially with said conduit for spreading backfire issuing therefrom, a chamber surrounding said baffle, said chamber having an inlet and an outlet at right angles to each other, and a second baffle means for preventing straight line communication between said inlet and outlet and means for supplying air under pressure to said chamber.

17. In an internal combustion engine, an intake manifold, a carbureter for supplying fuel mixture to said manifold, a supply conduit for supplying air to said carbureter, means for supplying air under pressure to said conduit, and means for dissipating backfire comprising substantially conical baffle mounted coaxially with said conduit for spreading backfire issuing therefrom, a chamber surrounding said baffle, said chamber having an inlet and an outlet, and means in said chamber for directing backfires against said baffle, said inlet and said outlet being formed at an angle to each other and means for supplying air under pressure to said chamber, said pressure supplying means comprising an additional backfire dissipating means.

In witness whereof I have hereunto set my hand.

ELBERT J. HALL.